United States Patent
Thompson et al.

(10) Patent No.: US 10,864,616 B2
(45) Date of Patent: *Dec. 15, 2020

(54) RATCHET MECHANISM FOR RATCHET WRENCH

(71) Applicant: Snap-on Incorporated, Kenosha, WI (US)

(72) Inventors: Christopher D Thompson, Franklin, WI (US); Daniel M Eggert, Kenosha, WI (US); David T Ross, Beach Park, IL (US)

(73) Assignee: Snap-on Incorporated, Kenosha, WI (US)

( * ) Notice: Subject to any disclaimer, the term of this patent is extended or adjusted under 35 U.S.C. 154(b) by 223 days.

This patent is subject to a terminal disclaimer.

(21) Appl. No.: 14/698,348

(22) Filed: Apr. 28, 2015

(65) Prior Publication Data

US 2015/0328750 A1    Nov. 19, 2015

Related U.S. Application Data

(60) Provisional application No. 61/993,850, filed on May 15, 2014.

(51) Int. Cl.
*B25B 13/46* (2006.01)
*F16D 41/16* (2006.01)
(Continued)

(52) U.S. Cl.
CPC ............ *B25B 13/463* (2013.01); *B25B 13/04* (2013.01); *B25B 13/08* (2013.01); *F16D 41/16* (2013.01)

(58) Field of Classification Search
CPC ..... B25B 13/463; B25B 13/462; B25B 13/46; B25B 13/461
(Continued)

(56) References Cited

U.S. PATENT DOCUMENTS 3,436,992 A * 4/1969 Over ..................... B25B 13/463
                                                                   81/63.1
5,157,994 A * 10/1992 Krivec ................. B25B 13/463
                                                                   81/63

(Continued)

FOREIGN PATENT DOCUMENTS

CN    200963800 Y    10/2007
CN    101293340 A    10/2008
(Continued)

OTHER PUBLICATIONS

State Intellectual Property Office of P.R. China Second Office Action dated Jan. 24, 2017; 10 pages.
(Continued)

*Primary Examiner* — Hadi Shakeri
(74) *Attorney, Agent, or Firm* — Seyfarth Shaw LLP

(57) ABSTRACT

A tool that includes a wrench body a first drive end, and a ratchet gear disposed in an aperture in the first drive end. A first cavity is formed in the first drive end and in communication with the aperture. First and second pawls are disposed in the first cavity, and the first and second pawls each includes teeth adapted to engage the ratchet gear. A second cavity is formed in the first drive end and is in communication with the first cavity. The second cavity receives a reversing disc adapted to selectively engage the first and second pawls to cause engagement and dis-engagement of the first and second pawls with the ratchet gear. By orienting the pawls to allow the second cavity to have a minimum depth, the head of the wrench can be stiffened, thereby increasing fatigue strength and rigidity of the wrench.

20 Claims, 10 Drawing Sheets

(51) Int. Cl.
*B25B 13/04* (2006.01)
*B25B 13/08* (2006.01)

(58) Field of Classification Search
USPC .................................................. 81/63.1, 62
See application file for complete search history.

(56) References Cited

U.S. PATENT DOCUMENTS

| | | | |
|---|---|---|---|
| 5,199,330 A | 4/1993 | Arnold et al. | |
| 5,489,285 A | 2/1996 | Goris | |
| 5,622,089 A | 4/1997 | Gifford | |
| 5,782,147 A | 7/1998 | Chaconas et al. | |
| 5,901,620 A | 5/1999 | Arnold | |
| 6,260,448 B1* | 7/2001 | Chaconas | B25B 13/463 81/60 |
| 6,279,428 B1 | 8/2001 | Huang | |
| 6,431,031 B1 | 8/2002 | Hu | |
| 6,457,387 B1 | 10/2002 | Hu | |
| 6,568,299 B2 | 5/2003 | Hu | |
| 6,584,875 B1 | 7/2003 | Deng | |
| 6,691,594 B2 | 2/2004 | Chen | |
| 6,918,477 B2* | 7/2005 | Tuanmu | B25B 13/463 192/43.1 |
| 6,955,104 B2 | 10/2005 | Hu | |
| 6,971,285 B2* | 12/2005 | Chen | B25B 13/463 81/177.85 |
| 6,981,434 B2 | 1/2006 | Chen | |
| 7,017,453 B2* | 3/2006 | Hu | B25B 13/463 81/63 |
| 7,073,412 B1 | 7/2006 | Arnold | |
| 7,111,527 B1* | 9/2006 | Lee | B25B 13/463 81/58.1 |
| 7,143,669 B2 | 12/2006 | Hu | |
| 7,185,566 B2 | 3/2007 | Arnold et al. | |
| 7,287,448 B2 | 10/2007 | Hu | |
| 7,299,720 B1* | 11/2007 | Schultz | B25B 13/463 81/62 |
| 7,421,772 B2 | 9/2008 | Gao et al. | |
| 7,661,337 B2 | 2/2010 | Chen | |
| 7,921,751 B2* | 4/2011 | Hu | B25B 13/463 81/63.1 |
| 7,987,747 B2* | 8/2011 | Ross | B25B 13/463 81/62 |
| RE42,768 E | 10/2011 | Huang | |
| 8,210,073 B2 | 7/2012 | Hu | |
| 8,245,602 B2 | 8/2012 | Chan | |
| 8,250,947 B2 | 8/2012 | Hu | |
| 8,297,152 B2 | 10/2012 | Hu | |
| 8,499,666 B2 | 8/2013 | Hopper et al. | |
| 8,683,894 B1 | 4/2014 | Chen | |
| 9,709,141 B2* | 7/2017 | Thompson | B25B 13/46 |
| 10,118,278 B2* | 11/2018 | Thompson | B25B 13/463 |
| 10,322,497 B2* | 6/2019 | Thompson | B25B 13/08 |
| 2002/0026858 A1 | 3/2002 | Hu | |
| 2004/0016322 A1 | 1/2004 | Hu | |
| 2004/0055423 A1 | 3/2004 | Hu | |
| 2004/0177725 A1 | 9/2004 | Shih-Yueh | |
| 2004/0200321 A1 | 10/2004 | Chen | |
| 2004/0261584 A1 | 12/2004 | Huang | |
| 2005/0011315 A1 | 1/2005 | Chen | |
| 2005/0235782 A1* | 10/2005 | Shen | B25B 13/463 81/63.2 |
| 2006/0117913 A1 | 1/2006 | Chen | |
| 2006/0065078 A1 | 3/2006 | Chen et al. | |
| 2008/0229887 A1* | 9/2008 | Thompson | B25B 13/463 81/62 |
| 2008/0229889 A1* | 9/2008 | Hopper | B25B 13/463 81/63.1 |
| 2010/0031783 A1 | 2/2010 | Hu | |
| 2011/0048179 A1 | 3/2011 | Hu | |
| 2013/0152742 A1* | 6/2013 | Chen | B25B 13/463 81/63.1 |
| 2013/0276593 A1* | 10/2013 | Yang | B25B 13/463 81/60 |
| 2013/0283982 A1 | 10/2013 | Hopper et al. | |
| 2013/0291688 A1* | 11/2013 | Hu | B25B 13/463 81/63.1 |

FOREIGN PATENT DOCUMENTS

| | | |
|---|---|---|
| CN | 101678436 A | 3/2010 |
| CN | 101678536 A | 3/2010 |
| CN | 103101037 | 5/2013 |
| CN | 203092440 U | 7/2013 |
| DE | 20005280 U | 5/2000 |
| DE | 202006017293 | 3/2007 |
| DE | 202012007004 U1 | 11/2012 |
| DE | 202013103841 | 9/2013 |
| GB | 2146279 A | 4/1985 |
| GB | 2353746 A | 7/2001 |
| GB | 2439791 A | 1/2008 |
| GB | 2447765 B | 9/2008 |
| HK | 1137384 A1 | 12/2012 |
| TW | 200914210 | 4/2009 |
| WO | 2008115771 A | 9/2008 |

OTHER PUBLICATIONS

Australian Government Patent Examination Report No. 1, dated Dec. 17, 2015; 4 pages.
State Intellectual Property Office of P.R. China, the First Office Action, dated May 30, 2016; 9 pages.
United Kingdom Intellectual Property Office Examination Report, dated Jul. 12, 2016; 3 pages.
Canadian Intellectual Property Examiner's Report, dated Sep. 8, 2016; 4 pages.
United Kingdom Intellectual Property Office Combined Search and Examination Report, dated Oct. 14, 2015; 7 pgs.
Taiwan Office Action for Application No. 104115499, dated Aug. 31, 2017, 11 pages.
Chinese Office Action for Application No. 201510244797.4 dated Dec. 27, 2017, 7 pages.
Chinese Office Action for Application No. 201510244796.X dated Sep. 11, 2017, 9 pages.
Chinese Office Action for Application No. 201510244841.1 dated Jul. 20, 2017, 7 pages.
Australian Examination Report for Application No. 2016277550 dated Feb. 1, 2018, 4 pages.
Chinese Notification of Reexamination for Application No. 201510244796.X dated Oct. 9, 2018, 9 pages.
Chinese Notification of Reexamination for Application No. 201510244841.1 dated May 28, 2019, 8 pages.
Examination Report No. 1 for Australian Application No. 2019200706 dated Jan. 29, 2020, 6 pages.
Chinese Office Action for Application No. 201910944051.2 dated Sep. 11, 2020, 5 pages.

* cited by examiner

RATCHET MECHANISM FOR RATCHET WRENCH

CROSS REFERENCES TO RELATED APPLICATIONS

The present application claims the benefit of U.S. Provisional Patent Application Ser. No. 61/993,850, filed May 15, 2014, entitled Low Profile Ratchet Wrench, the contents of which is incorporated herein by reference in its entirety.

FIELD

The present invention relates generally to ratchet mechanisms. More particularly, the present invention relates to improved ratchet wrench devices and methods.

BACKGROUND

Reversible ratchet mechanisms, such as ratchet wrenches, are well-known and used. Typically there is a drive portion engageable with a work piece, for example, a bolt head. In general, a first rotational drive direction may be selected for the ratchet mechanism so that use of the tool applies torque when engaged with the bolt head and rotated in a first direction, while slipping or ratcheting when rotated in an opposing, second direction. A second rotational drive direction may be selected for the ratchet mechanism that is opposite the first drive direction, which then provides torque in the second direction, while slipping or ratcheting when rotated in the opposite first direction.

Conventional ratchet wrenches with large holes and cavities for retaining components of the wrenches, such as box type ratchet wrenches, tend to flex when under load. This flex can cause premature fatigue failures of the tools.

SUMMARY

An embodiment of the present invention broadly includes a ratcheting mechanism having pawls oriented in a way to allow a cavity in which a reversing disc is disposed to have a minimum depth. By minimizing the depth of the cavity, the head of the tool may be stiffened, thereby increasing fatigue strength and rigidity of the tool.

In an embodiment, a tool includes a first drive end with an aperture. A ratchet gear is disposed in the aperture and includes a receiving portion adapted to engage a work piece, such as a bolt of nut, to apply torque to the work piece. A first cavity is formed in the first drive end and is in communication with the aperture. First and second pawls are disposed in the first cavity, wherein the first and second pawls each includes teeth adapted to cooperatively engage gear teeth disposed on the ratchet gear. A second cavity is formed in the first drive end and is in communication with the first cavity, wherein the second cavity has a depth less than the first cavity. A reversing disc is disposed in the second cavity and adapted to selectively engage either of the first and second pawls to cause engagement and dis-engagement of the first and second pawls with the ratchet gear, thereby selecting the torque application rotational direction and the ratcheting rotational direction of the receiving portion.

In another embodiment, a ratcheting mechanism for a tool includes a ratchet gear with a receiving portion, an engagement surface surrounding the receiving portion adapted to operatively engage a work piece, and ratchet teeth on an outer circumferential surface of the ratchet gear. First and second pawls, each including pawl teeth, are selectively adapted to cooperatively engage the ratchet teeth. A reversing disc is adapted to selectively engage either of the first and second pawls to cause engagement and dis-engagement of the first and second pawls with the ratchet gear, thereby selecting the torque application rotational direction and the ratcheting rotational direction of the receiving portion. A cavity having a minimum depth to accommodate the reversing disc is formed in the tool, and the reversing disc is disposed in the cavity.

BRIEF DESCRIPTION OF THE DRAWINGS

For the purpose of facilitating an understanding of the invention, there are illustrated in the accompanying drawings embodiments thereof, from an inspection of which, when considered in connection with the following description, the invention, its construction and operation, and many of its advantages should be readily understood and appreciated.

DETAILED DESCRIPTION

Figure 1:
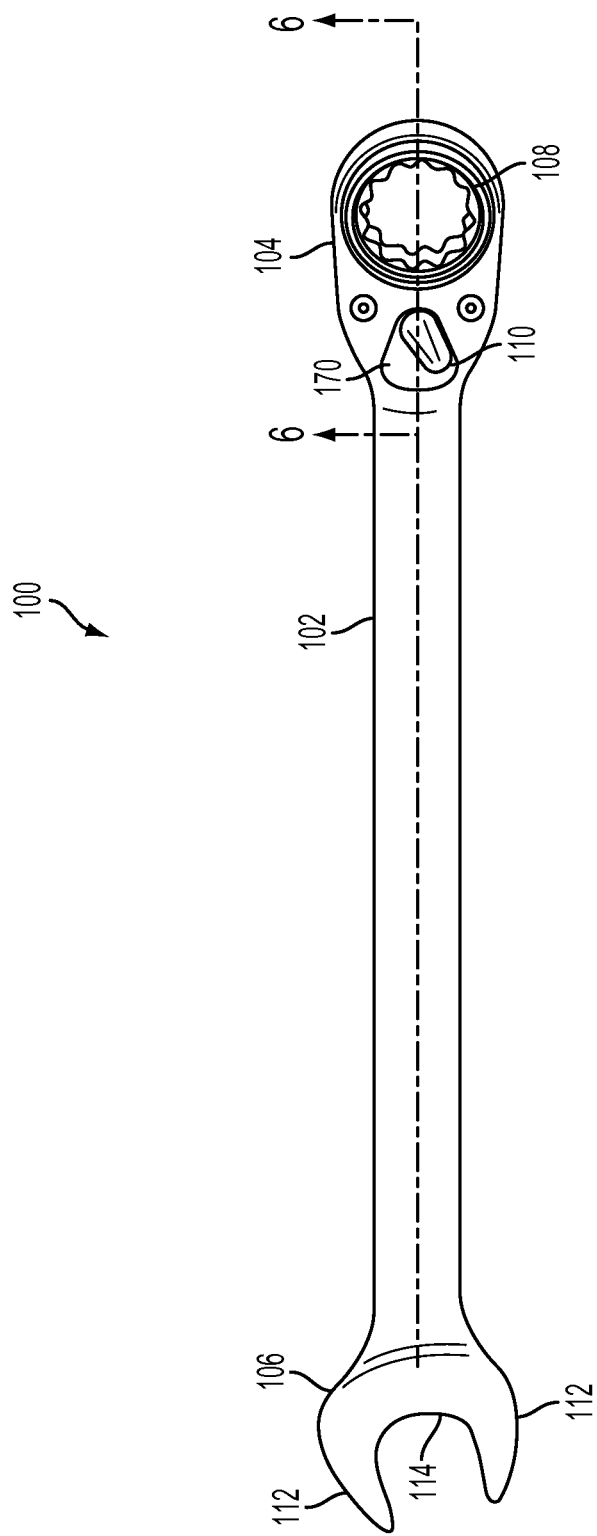
FIG. 1 is a plan view of a ratchet wrench according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

An embodiment of the present invention broadly comprises a tool, such as a ratchet wrench, with improved fatigue strength and rigidity by having a more rigid design. Ratchet wrenches with large holes, such as box type ratchet wrenches, tend to flex when under load causing premature fatigue failures. Embodiments of the present invention solve this issue, by orienting the pawls to allow a cavity in which a reversing disc is disposed to have a minimum depth. By minimizing the depth of the cavity, the head of the ratchet wrench may be stiffened, thereby increasing fatigue strength and rigidity of the ratchet wrench.

In an embodiment, a tool 100 is described with reference to FIG. 1. The tool 100 includes a wrench body or handle 102 with opposing first and second ends respectively having a first drive end 104 and a second drive end 106. Each of the first and second drive ends 104, 106 is adapted to engage with a work piece (not shown), for example a bolt or a nut, to apply torque to the work piece. In another embodiment, the tool includes just the first drive end 104.

In an embodiment, the first drive end 104 is of a ratcheting-type and includes a ratcheting mechanism having a ratchet gear 108 and a reversing lever 110 allowing a user to selectively determine a rotational direction of the tool 100. More specifically, the ratchet gear 108 is operatively engageable with a work piece, for example, a bolt with a hexagonal head. When the reversing lever 110 is disposed in a first position, torque application is permitted with rotation of the ratchet gear 108 in a first rotational drive direction, while slippage or ratcheting occurs with rotation of the ratchet gear 108 in a second rotational drive direction opposite the first rotational direction. Conversely, when the reversing lever 110 is disposed in a second position, torque application is permitted with rotation of the ratchet gear 108 in the second rotational drive direction, while slippage or ratcheting occurs in the first rotational drive direction.

In an embodiment, the second drive end 106 is of an open-ended wrench type. As illustrated, the second drive end 106 includes arms 112 that form a receiving portion 114 adapted to releasably engage a work piece, for example, a bolt with a hexagonal head, and to transmit torque from the tool 100 to the work piece. It should be appreciated that while the present tool is depicted as having an open-ended box wrench on one end and a ratchet wrench on the other end, other configurations of the present invention can be used without departing from the spirit and scope of the present application, such as, for example, having a ratchet wrench on each of the first and second ends of the handle 102, or having another type of tool on the second end.

Figure 2:
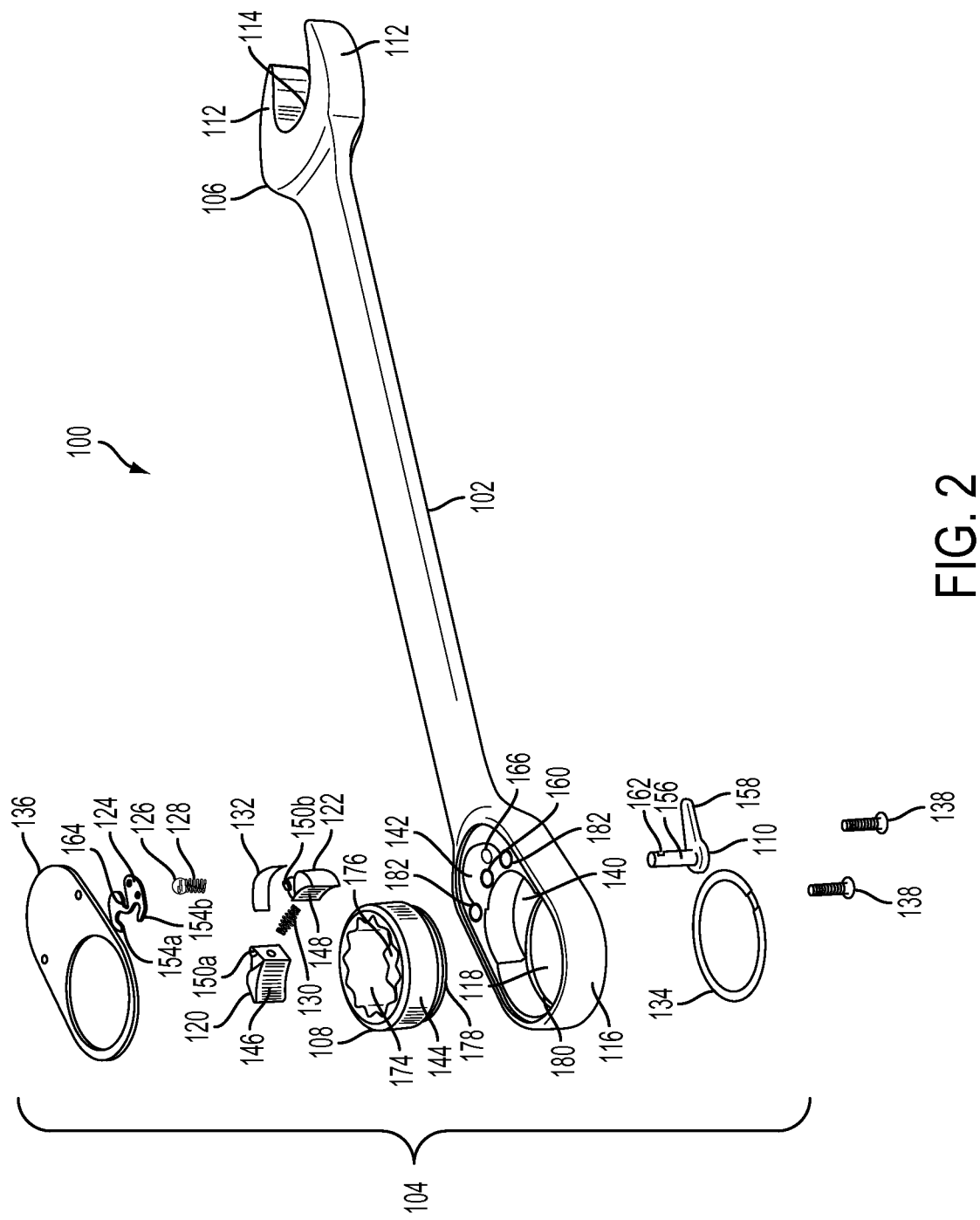
FIG. 2 is an exploded perspective view of the ratchet wrench of FIG. 1.

As illustrated in FIG. 2, in an embodiment, the first drive end 104 includes a head portion 116 including an aperture 118 and one or more cavities for receiving and retaining one or more components that, when assembled, form the ratcheting mechanism of the first drive end 104. The components may include, for example, pawls 120 and 122, a reversing disc 124, a ball 126 and spring 128, a first spring 130 and a second spring 132, the ratchet gear 108, the reversing lever 110, a retaining ring 134, and a cover plate 136 and fasteners 138.

It has been shown that embodiments of the tool 100 of the present invention have an improved fatigue strength and rigidity, compared to traditional ratchet wrenches. The tool 100 improves the strength and rigidity by orienting the pawls 120 and 122 to minimize a depth of one or more of the cavities in the head portion 116, as described in further detail below.

Figure 3:
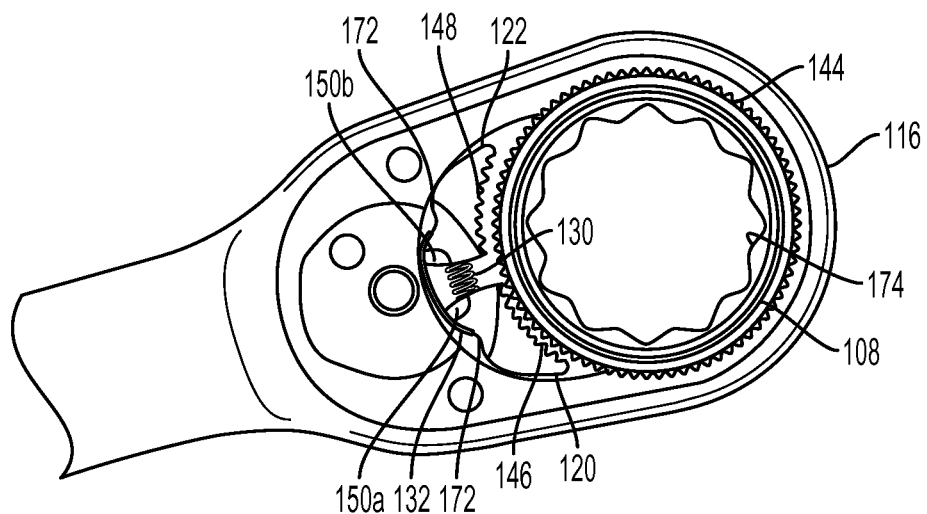
FIG. 3 is a first plan view of the ratchet wrench of FIG. 1 with a cover plate removed.

Referring to FIGS. 2 and 3, the head portion 116 includes aperture 118, a first cavity 140 adjacent to and communicating with the aperture 116, and a second cavity 142 adjacent to and communicating with the first cavity 140. The pawls 120 and 122 are disposed in the first cavity 140 to allow the pawls 120 and 122 to selectively move into and out of meshing engagement with the ratchet gearing or teeth 144 of the ratchet gear 108. The pawls 120 and 122 respectively include teeth 146 and 148, adapted to cooperatively engage ratchet gearing or teeth 144 of the ratchet gear 108 to allow torque to be applied in a selected direction. The pawls 120 and 122 respectively include post 150a, 150b adapted to engage with the reversing disc 124.

Figure 4:
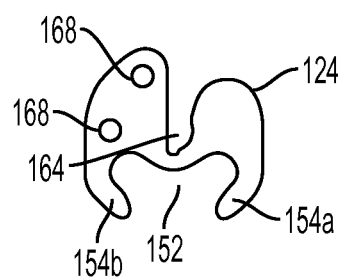
FIG. 4 is a top plan view of a reversing lever disc of the ratchet wrench of FIG. 1, removed from the wrench for illustration purposes.
Figure 5:
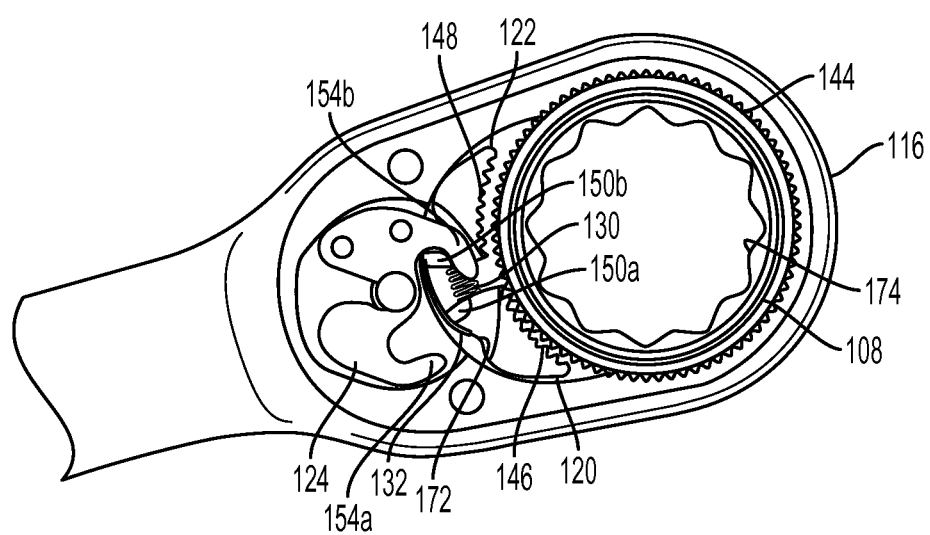
FIG. 5 is a second plan view of the ratchet wrench of FIG. 1 with the cover plate removed.

As illustrated in FIGS. 2 and 4-5, the reversing disc 124 is disposed in the second cavity 142. In an embodiment, the second cavity 142 has a depth less than the first cavity 140, and is adjacent to and communicates with the first cavity 140 to allow the reversing disc 124 to interact with the pawls 120 and 122. Referring to FIGS. 2 and 4, the reversing disc 124 includes an arcuate opening 152 defining disc hooks 154a and 154b adapted to respectively engage posts 150a and 150b. Referring to FIG. 5, as the reversing disc 124 is shifted to one position for a selected drive direction, a first hook 154b engages a first post 150b of, for example, the pawl 122, and continued rotation of the reversing disc 124 draws the pawl 122 away from and out of engagement with the ratchet gear 108. At the same time, a second hook 154a allows the post 150a to move through the opening 152 so that the pawl 120 shifts and becomes engaged with the ratchet gear 108.

Referring to FIGS. 2, 3 and 5, the posts 150a, 150b of the pawls 120 and 122 are proximate an opening of the first cavity 140 and oriented to face in a direction of the cover plate 136 or bottom of the head portion 116. This allows the depth of the second cavity 142 that receives the reversing disc 124 to be minimized, i.e. to be only deep enough to accommodate the reversing disc 124. Minimizing the depth of the second cavity 142 stiffens the head portion 116 improving the strength, rigidity, and the fatigue life of the tool 100.

A bias member, such as the first spring 130, may also be disposed between the pawls 120, 122. The ends of the first spring 130 are received and retained by a bore formed in a side of each pawl 120, 122, the respective bores of the pawls 120, 122 being in an opposed orientation to allow the first spring 130 to bias the pawls 120, 122 away from each other while also ensuring that only one of the pawls 120, 122 is in engagement with the ratchet gear 108 at a time. In this manner, when the reversing disc 124 engages a selector post 150a or 150b of one of the pawls 120, 122 to move the pawl, the spring 130 causes the other pawl to shift position. Additionally, the spring 130 allows the pawl to cam or deflect away from the ratchet gear 108 when a first drive direction is selected but the ratchet tool is rotated in reverse, in an opposite direction, to allow slippage or ratcheting in that direction. The spring 130 then forces the pawl to return to engagement with the ratchet gear 108 when the reverse movement ceases.

Figure 6:
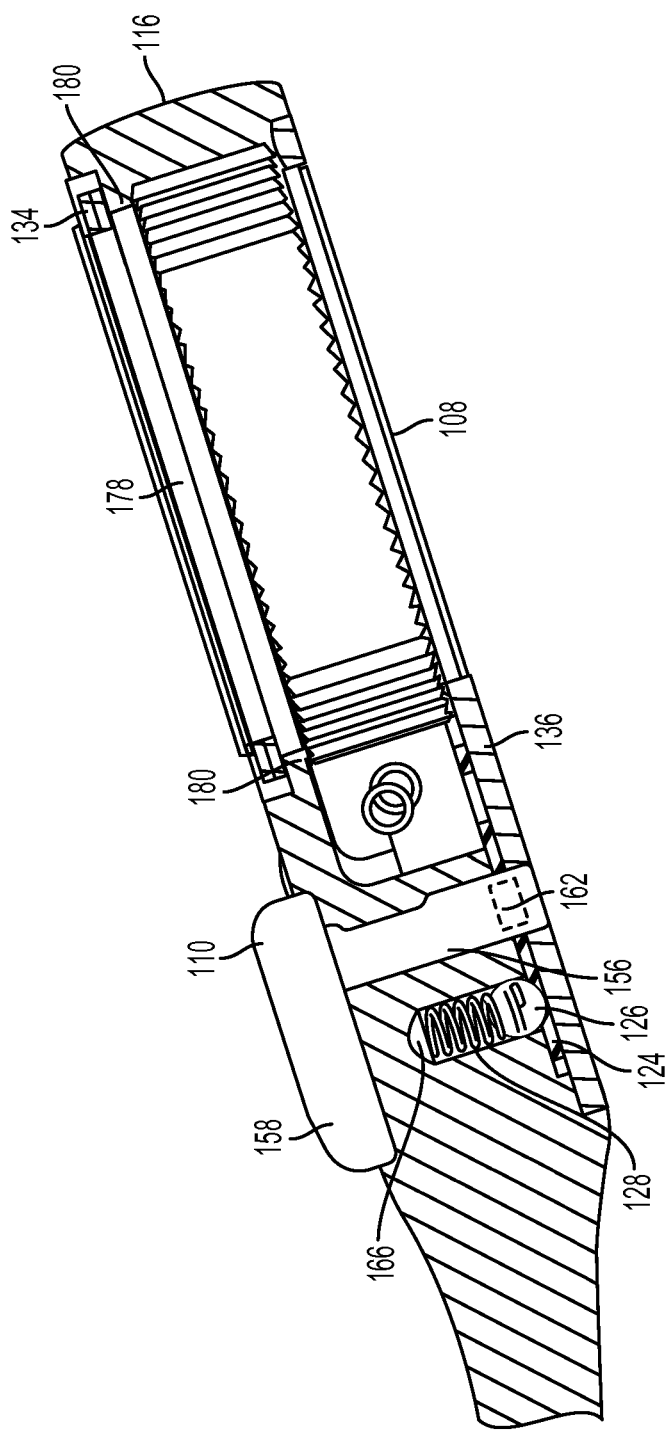
FIG. 6 is an enlarged, cross-sectional view of the ratchet wrench of FIG. 1, taken along line 6-6 of FIG. 1.

Referring to FIGS. 2 and 6, the reversing lever 110 and reversing disc 124 allow for selective engagement and dis-engagement of the pawls 120, 122 with the ratchet gear 108. The reversing lever 110 includes a stem portion 156 and a lever portion 158. The stem portion 156 is received in a throughbore 160 provided in the head portion 116 with the lever portion 158 positioned on an outside of the head portion 116 for manual operation by a user to select a rotational drive direction. The reversing lever 110 also includes a notch 162 in the stem portion 156 for receiving the reversing disc 124.

Referring to FIGS. 2 and 4, the reversing disc 124 has a channel 164 allowing the reversing disc 124 to be slid into the notch 162 and rotated onto the stem portion 156. In this manner, the reversing lever 110 and the reversing disc 124 co-rotate when the reversing lever 110 is moved between positions for selecting the rotational drive direction.

Referring to FIGS. 2 and 6, a ball and detent structure is provided to assist in holding the reversing disc 124 in place.

In this aspect, a blind bore 166 is located in the second cavity 142. The spring 128 is disposed in the bore 166 and the ball 126 is disposed on the spring 128, proximate an opening of the bore 166. As illustrated in FIG. 4, the reversing disc 124 includes corresponding first and second detents or bores 168 on a side of the reversing disc 124 facing the second cavity 142. The detents 168 are disposed to correspond to the proper position for the ball 126 when the reversing lever 110 is in the proper position for the first and second rotational drive directions, respectively. Referring to FIG. 6, as the reversing lever 110 is rotated out of a position for a rotational drive direction, the ball 126 contacts an edge of one of the detents 168, thereby deflecting downwardly by compression of the spring 128. When the reversing lever 110 is shifted to the proper position for a rotational drive direction, the ball 126 shifts into alignment with one of the detents 168, and the spring 128 biases the ball 126 into the detent 168.

In this embodiment, referring to FIG. 1, a stop mechanism is provided by structure formed on the tool 100 to limit over-travel or over-rotation of the reversing lever 110. For example, a recess 170 is formed on an exterior of the tool 100. The recess 170 receives the lever portion 158 of the reversing lever 110. The recess 170 is shaped to prevent over-rotation of the reversing lever 110 and the reversing disc 124. Rotation of the reversing lever 110, and thereby the reversing disc 124, to a first position for a first rotational drive direction results in the reversing lever 110 contacting a first edge of the recess 170 (as illustrated in FIG. 1), and rotation of the reversing lever 110 from the first position to a second position for a second rotational drive direction results in the reversing lever 110 contacting a second edge of the recess 170. The stop mechanism may also be provided by structure formed on the reversing disc and the cavity, as described below with reference to tool 200.

In an aspect, the tool 100 also provides a means to limit pawl travel during ratcheting or use of the tool 100. Referring to FIGS. 2 and 3, the second spring 132 is disposed in the first cavity 140 and in engagement with relief portions 172 of the pawls 120, 122. As illustrated in FIG. 3, the relief portions 172 are located on a side of the pawls 120, 122 opposite the teeth 146, 148, respectively. The second spring 132 biases the pawls 120, 122 in a direction towards the ratchet gear 108 and restricts travel of the pawls 120, 122 during a ratcheting operation. This also increases the minimum ratchet travel between loading.

Referring to FIGS. 2 and 6, the ratchet gear 108 has a generally circular body portion with ratchet gearing or teeth 144 disposed on an outer circumferential surface, and engagement surfaces 174 surrounding a receiving portion or receiving aperture 176 adapted to operatively engage a working piece, for example, a bolt with a hexagonal head. The ratchet gear 108 also includes a ring groove 178 proximal to an end of the ratchet gear and adapted to receive the retaining ring 134. The ratchet gear 108 is disposed in the aperture 118, with the ring groove 178 extending past a retaining web or shoulder 180 in the aperture 118 and the ratchet gearing or teeth 144 remaining in the aperture 118. In this aspect, the retaining web 180 and retaining ring 134 cooperatively hold the ratchet gear 108 in the aperture 118.

When traditional ratchet wrenches are loaded at an angle, other than perpendicular to an axis of rotation, the ratchet gear tends to tilt. This causes a load to be applied to the cover plate of the wrench, which in turn applies a load on the retention screws holding the cover plate on the wrench and causing the retention screws to stress or fail. Embodiments of the tool 100 of the present invention solve this problem by trapping the ratchet gear 108 with the retaining web 180 and retaining ring 134. The retaining web 180 and retaining ring 134 prevent the ratchet gear 108 from applying a load to the cover plate 136 and fasteners 138 during use, thus minimizing stresses on the cover plate 136 and fasteners 138.

Referring to FIG. 2, the tool 100 may be assembled by disposing the ratchet gear 108 in the aperture 118, with the ring groove 178 extending planarly beyond the retaining web 180. The retaining ring 134 is disposed in the ring groove 178 to hold the ratchet gear 108 in the aperture 118 and prevent the ratchet gear 108 from applying force to the cover plate 136 and fasteners 138 during use. The pawls 120, 122 are disposed in the first cavity 140, with the teeth 146, 148, respectively, facing in a direction of the ratchet gear 108. The spring 130 is disposed between the pawls 120, 122 to bias the pawls 120, 122 apart. The spring 130 may be disposed between the pawls 120, 122 prior to or after disposing the pawls 120, 122 in the first cavity 140. The second spring 132 is also disposed in the first cavity 140 and engaged with the relief portions 172 of the pawls 120, 122 to limit pawl travel during ratcheting or use of the tool 100.

The reversing lever 110 is disposed in the throughbore 160, with the stem portion 156 and notch 162 extending into the second cavity 142 and the lever portion 158 remaining on an exterior surface of the tool 100 in the recess 170. The spring 128 and the ball 126 are inserted into a blind bore 166 disposed in the second cavity 142, with the ball 126 proximate the opening of the blind bore 166. The reversing disc 124 is then disposed in the second cavity 142 and assembled onto the stem portion 156 by engaging the channel 164 with the notch 162 of the stem portion 156. The reversing disc 124 is rotated and a hook 154a or 154b is disposed around one of the pawl posts 150a or 150b. The cover plate 136 is then coupled on the tool 100 by inserting the fasteners 138 into fastener apertures 182 and coupling the fasteners 138 to the cover plate 136.

Figure 7:
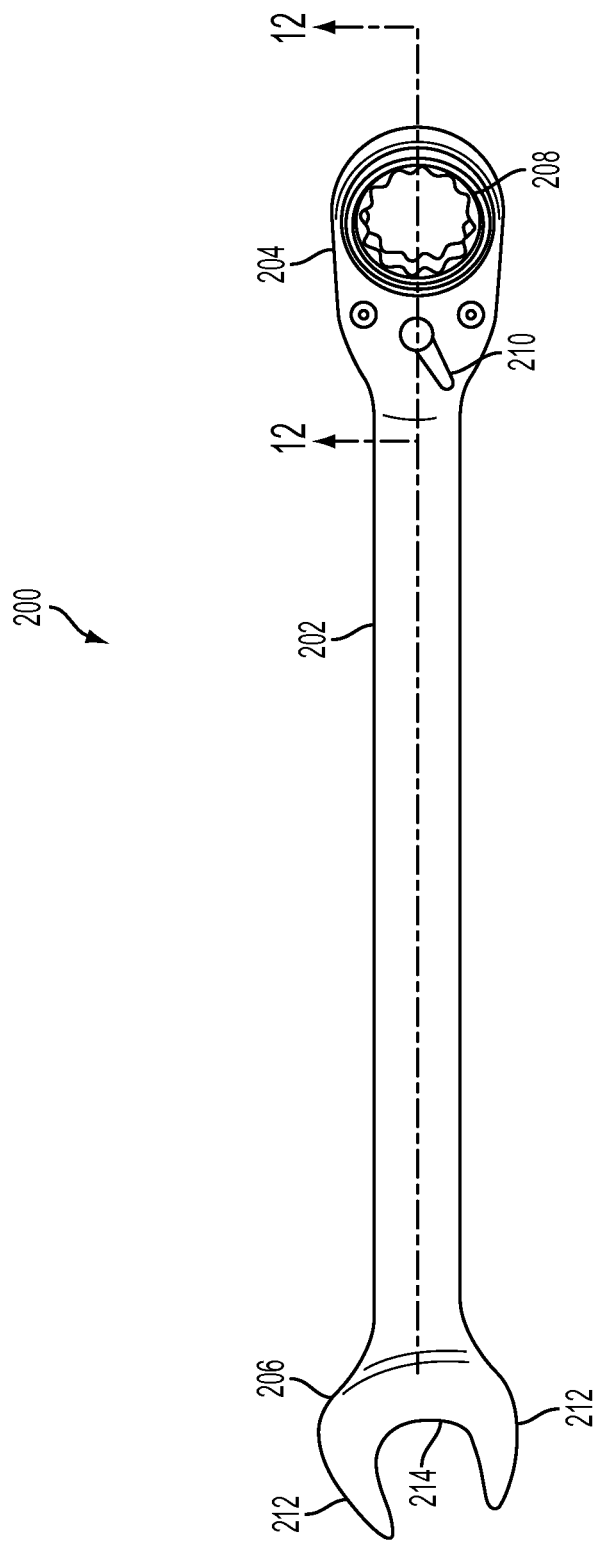
FIG. 7 is a plan view of a ratchet wrench according to another embodiment of the present invention.

In another embodiment, a tool 200 is described with reference to FIG. 7. The tool 200 is similar to the tool 100, described above, and operates and functions in a similar manner. For example, the tool 200 includes a wrench body or handle 202 with opposing first and second ends respectively having first and second drive ends 204, 206. As described above with reference to the tool 100, the first and second drive ends 204, 206 are adapted to engage a work piece for providing a torque thereto. In another embodiment, the tool 200 includes just first drive end 204.

In an embodiment, the first drive end 204 is of a ratcheting type and includes a ratchet gear 208 and a reversing lever 210 allowing a user to selectively determine a torque application direction. The ratchet gear 208 is operatively engageable with a work piece. When the reversing lever 210 is in a first position, torque drive is permitted with rotation of the ratchet gear 208 in a first rotational drive direction, while slippage or ratcheting occurs with rotation of the ratchet gear 208 in a second rotational drive direction opposite the first rotational drive direction. Conversely, when the reversing lever 210 is in a second position, torque drive is permitted with rotation of the ratchet gear 208 in the second rotational drive direction, while slippage or ratcheting occurs in the first rotational drive direction.

In an embodiment, the second drive end 206 is of an open-ended wrench type and includes arms 212 that form a receiving portion 214 adapted to releasably engage a work piece. However, it should be appreciated that other configurations of the present invention can be used without departing from the spirit and scope of the present application, such as, for example, having ratchet wrenches on each of the first and second ends of the handle 202 or another tool.

Figure 8:
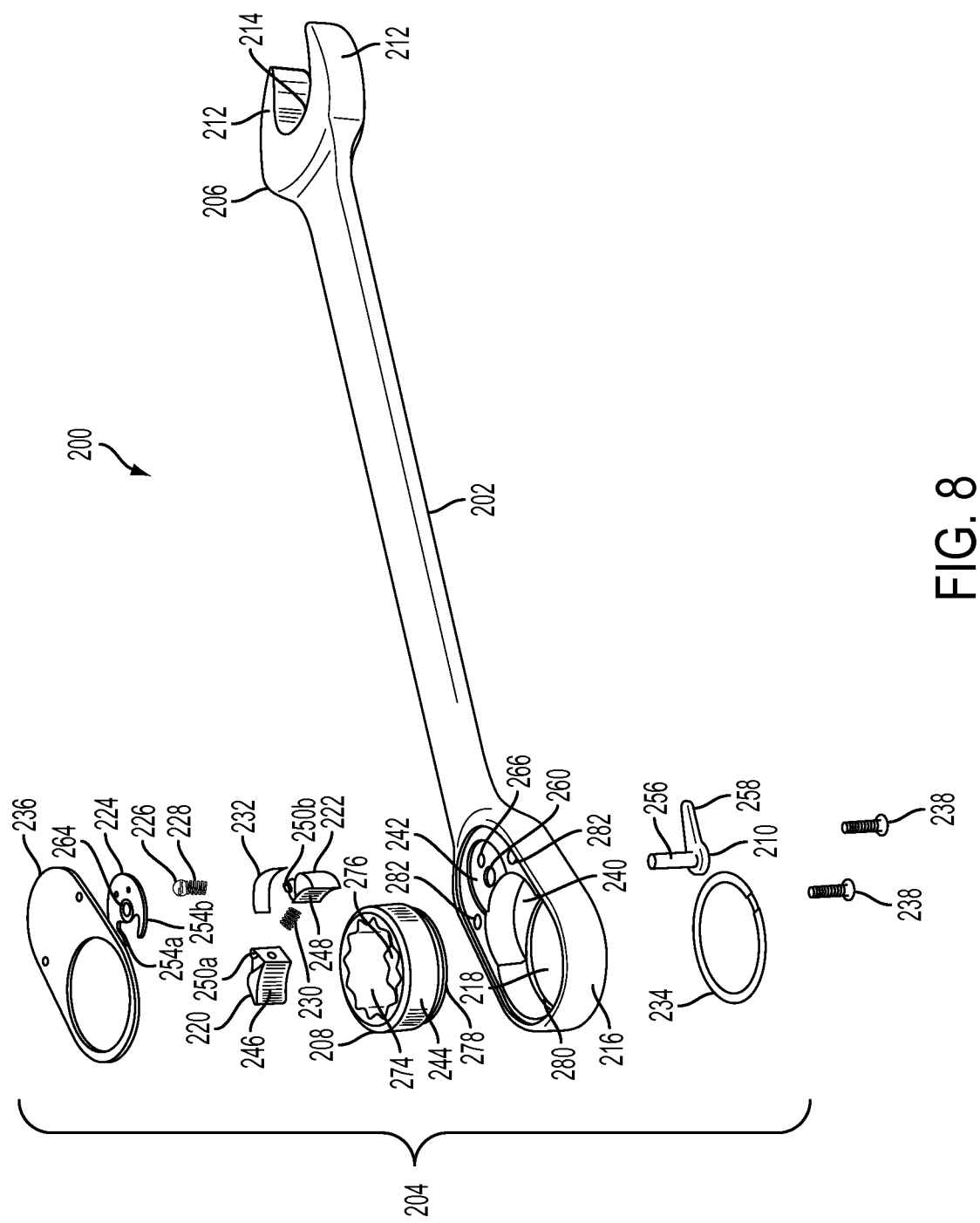
FIG. 8 is an exploded, perspective view of the ratchet wrench of FIG. 7.

Referring to FIG. 8, in an embodiment, the first drive end 204 includes a head portion 216 having an aperture 218 and one or more cavities for receiving and retaining one or more of components of a ratchet mechanism that, when assembled, form the first drive end 204. The components may include, for example, pawls 220, 222, a reversing disc 224, a ball 226 and spring 228, a first spring 230 and a second spring 232, ratchet gear 208, reversing lever 210, a retaining ring 234, and a cover plate 236 and fasteners 238.

Embodiments of the tool 200 of the present invention have an improved fatigue strength and rigidity, compared to traditional ratchet wrenches. The tool 200 of the present invention improves the strength and rigidity by orienting the pawls 220, 222 to minimize a depth of one or more of the cavities in the head portion 216, as described in further detail below.

Figure 9:
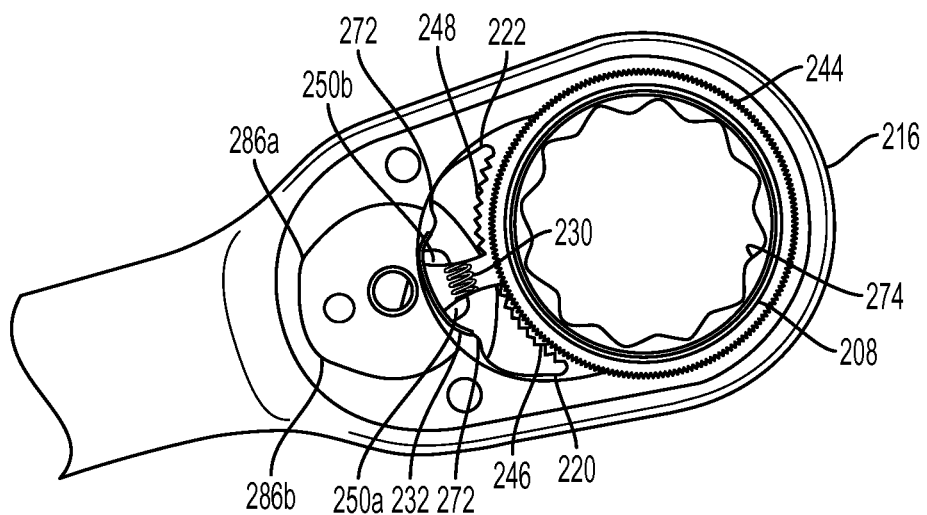
FIG. 9 is a first plan view of the ratchet wrench of FIG. 7, with a cover plate removed.

Referring to FIGS. 8 and 9, the head portion 216 includes the aperture 218, a first cavity 240 adjacent to and communicating with the aperture 216, and a second cavity 242 adjacent to and communicating with the first cavity 240. The pawls 220, 222 are disposed in the first cavity 240 to allow the pawls 220, 222 to selectively move into and out of engagement with the ratchet gearing or teeth 244 of the ratchet gear 208. The pawls 220, 222 respectively include teeth 246, 248 adapted to cooperatively engage the ratchet gearing or teeth 244 of the ratchet gear 208 to allow torque to be applied in a selected rotational direction. The pawls 220, 222 respectively include post 250a, 250b adapted to engage with the reversing disc 224.

Figure 10:
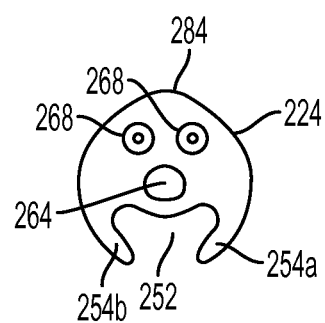
FIG. 10 is a plan view of a reversing lever disc of the ratchet wrench of FIG. 7 removed from the wrench for illustration purposes.
Figure 11:
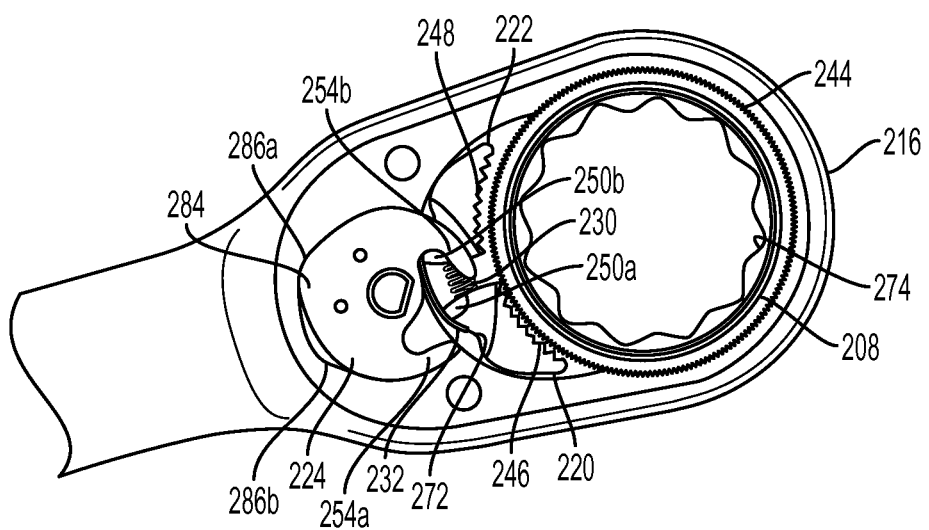
FIG. 11 is a second plan view of the ratchet wrench of FIG. 7 with the cover plate removed.

Referring to FIGS. 8 and 10-11, the reversing disc 224 is disposed in the second cavity 242. As illustrated, the second cavity 242 has a depth less than the first cavity 240, and is adjacent to and communicates with the first cavity 240 to allow the reversing disc 224 to interact with pawls 220, 222. Referring to FIGS. 8 and 10, the reversing disc 224 may include an arcuate opening 252 defining disc hooks 254a, 254b adapted to respectively engage posts 250a, 250b. Referring to FIG. 11, as the reversing disc 224 is shifted to one position for a selected rotational drive direction, a first hook 254b engages first post 250b of, for example, pawl 222, and continued rotation of the reversing disc 224 draws the pawl 222 away from and out of meshing engagement with the ratchet gear 208. At the same time, a second hook 254a allows the post 250a to move through the opening 252 so that pawl 220 shifts and becomes cooperatively engaged with the ratchet gear 208.

Referring to FIGS. 8, 9 and 11, posts 250a, 250b of pawls 220, 222 are proximate an opening of the first cavity 240 and oriented to face a direction of the cover plate 236 or bottom of the head portion 216. This allows the depth of the second cavity 242 that receives the reversing disc 224 to be minimized, i.e. to be only deep enough to accommodate the reversing disc 224. Minimizing the depth of the second cavity 242 stiffens the head portion 216 improving the strength, rigidity, and the fatigue life of the tool 200.

A bias member, such as the first spring 230, may also be disposed between the pawls 220, 222. The ends of the first spring 230 are received and retained by a bore formed in a side of each pawl 220 and 222, the respective bores of the pawls 220, 222 being in an opposed orientation to allow the first spring 230 to bias the pawls 220, 222 away from each other while also ensuring that only one of the pawls 220, 222 is in engagement with the ratchet gear 208 at a time. In this manner, when the reversing disc 224 engages a selector post 250a or 250b of one of the pawls 220, 222 to move the pawl, the spring 230 causes the other pawl to shift position. Additionally, the spring 230 allows the pawl to cam or deflect away from the ratchet gear 208 when a first rotational drive direction is selected, but the ratchet tool is rotated in an opposing second rotational drive direction. The spring 230 then forces the pawl to return to engagement with the ratchet gear 208 when the reverse movement ceases.

Figure 12:
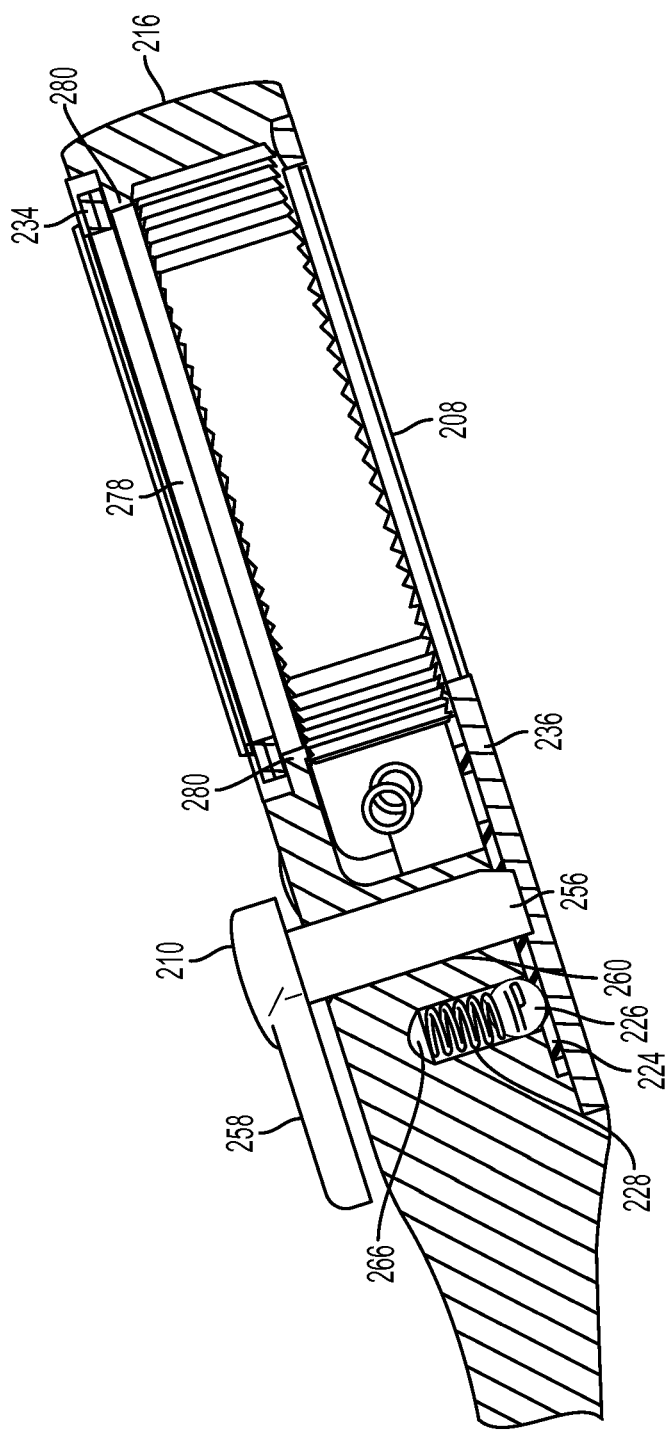
FIG. 12 is an enlarged, cross-sectional view of the ratchet wrench of FIG. 7 taken along line 12-12 of FIG. 12.

Referring to FIGS. 8 and 12, the reversing lever 210 and reversing disc 224 allow for selective engagement and dis-engagement of the pawls 220, 222 with the ratchet gear 208. The reversing lever 210 includes a stem portion 256 and a lever portion 258. The stem portion 256 is received in a throughbore 260 disposed in the head portion 216 with the lever portion 258 positioned on an outside of the head portion 216 for manual operation by a user to select a rotational drive direction.

Referring to FIGS. 8, 10 and 12, the reversing disc 224 has a bore 264, and the stem portion 256 has at least a portion with a complementary shape. In this manner, when the stem portion 256 is received in the bore 264, it is keyed to the reversing disc 224 to allow the reversing lever 210 and the reversing disc 224 to co-rotate when the reversing lever 210 is moved between positions for selecting the rotational drive direction.

Referring to FIGS. 8 and 12, a ball and detent structure is provided to assist in holding the reversing disc 224 in place. In this aspect, a blind bore 266 is disposed in the second cavity 242. The spring 228 is disposed in the bore 266 and the ball 226 is disposed on the spring 228, proximate an opening of the bore 266. As illustrated in FIG. 10, the reversing disc 224 includes corresponding first and second detents or bores 268 on a side of the reversing disc 224 facing the second cavity 242. The detents 268 are positioned to coaxially correspond to the position of the ball 226 when the reversing lever 210 is in the proper position for the first and second drive directions, respectively. Referring to FIGS. 10 and 12, as the reversing lever 210 is rotated out of a position for a drive direction, the ball 226 contacts an edge of one of the detents 268, thereby deflecting downwardly by compression of the spring 228. When the reversing lever 210 is shifted to the proper position for a drive direction, the ball 226 shifts into coaxial alignment with one of the detents 268, and the spring 228 biases the ball 226 into the detent 268.

In this embodiment, referring to FIGS. 9-11, a stop mechanism is provided by structure formed on the reversing disc 224 and by the shape of the cavity 242 to prevent over rotation of the reversing disc 224. The reversing disc 224 has a non-circular shape forming a tab portion 284 that extends from a radial side and, the cavity 242 includes first and second stops 286a, 286b formed by the non-circular shape of the cavity 242. Referring to FIG. 11, rotation of the reversing disc 224 to a first position for a first rotational drive direction results in the tab portion 284 contacting a first stop 286a, and rotation of the reversing disc 224 from the first position to a second position for a second rotational drive direction results in the tab portion 284 shifting to a second stop 286b. The interaction between the stops 286a, 286b and the reversing disc 224 prevent over rotation of the reversing lever 210.

In an embodiment, the tool 200 also provides a means to limit pawl travel during ratcheting or use of the tool 200. Referring to FIGS. 8 and 9, the second spring 232 is disposed in the first cavity 240 and in engagement with relief portions 272 of the pawls 220, 222. The second spring 232 biases the pawls 220, 222 in a direction towards the ratchet gear 208 and restricts travel of the pawls 220, 222 during a ratcheting operation. This also increases the minimum ratchet travel between loading.

Referring to FIGS. 8 and 12, the ratchet gear 208 has a generally circular body portion with ratchet gearing or teeth 244 on an outer circumferential surface, and engagement surfaces 274 surrounding a receiving portion or receiving aperture 276 adapted to operatively engage a work piece, for example, a bolt with a hexagonal head. The ratchet gear 208 also includes a ring groove 278 proximal to an end of the ratchet gear and adapted to receive the retaining ring 234. The ratchet gear 208 is disposed in the aperture 218, with the ring groove 278 extending past a retaining web or shoulder 280 in the aperture 218 and the ratchet gearing or teeth 244 remaining in the aperture 218. In this aspect, the retaining web 280 and retaining ring 234 cooperatively hold the ratchet gear 208 in the aperture 218. The tool 200 traps the ratchet gear 208 with the retaining web 280 and retaining ring 234 to prevent the ratchet gear 208 from applying a load to the cover plate 236 and fasteners 238 during use.

Referring to FIG. 8, the tool 200 may be assembled by disposing the ratchet gear 208 in the aperture 218, with the ring groove 278 extending planarly beyond the retaining web 280. The retaining ring 234 is disposed in the ring groove 278 to hold the ratchet gear 208 in the aperture 218. The pawls 220, 222 are disposed in the first cavity 240, with the teeth 246 and 248, respectively, facing in a direction of the ratchet gear 208. The spring 230 is disposed between the pawls 220, 222 to bias the pawls 220, 222 apart. The second spring 232 is also disposed in the first cavity 240 and engaged with the relief portions 272 of the pawls 220, 222 to limit pawl travel during ratcheting or use of the tool 200.

The reversing lever 210 is disposed in the throughbore 260, with the stem portion 256 extending into the second cavity 242 and the lever portion 258 remaining on an exterior surface of the tool 200. The spring 228 and the ball 226 are inserted into the blind bore 266 in the second cavity 242, with the ball 226 proximate the opening of the blind bore 266. The reversing disc 224 is then positioned in the second cavity 242 and assembled onto the stem portion 256. The reversing disc 224 is rotated and a hook 254a or 254b is disposed around one of the pawl posts 250a or 250b, and with the tab portion 284 (illustrated in FIG. 11) adjacent one of the stops 286a, 286b. The cover plate 236 is then coupled on the tool 200 by inserting the fasteners 238 into fastener apertures 282 and coupling the fasteners 238 to the cover plate 236.

As used herein, the terms "coupled," "coupling," and its functional equivalents are not intended to necessarily be limited to a direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and/or described, it will be apparent to those skilled in the art that changes and modifications may be made without departing from the broader aspects of the invention. The actual scope of the protection sought is intended to be defined in the following claims when viewed in their proper perspective.

What is claimed is:

1. A tool having a drive end with a ratchet gear disposed in an aperture and that includes a receiving portion adapted to engage and provide a torque to a work piece, the tool comprising:
    first and second pawls respectively having first and second pawl teeth that are each selectively engageable and disengageable with the ratchet gear;
    a reversing lever having a stem portion and including a notch formed in the stem portion; and
    a reversing disc including a channel extending from an edge of the reversing disc towards a central portion of the reversing disc in a radial direction, wherein the channel is adapted to receive the stem portion and allow the reversing disc to slide perpendicular to a longitudinal axis of the stem portion and into the notch, the reversing disc is adapted to co-rotate with the reversing lever when the reversing lever is moved between first and second positions to cause the selective engagement of one of the first and second pawl teeth with the ratchet gear and disengagement of the other of the first and second pawl teeth from the ratchet gear, thereby causing the receiving portion to provide the torque to the work piece in one of either first and second rotational directions and ratchet in the other of the first and second rotational directions.

2. The tool of claim 1, wherein the reversing lever includes a lever portion and is positioned on an exterior of the drive end.

3. The tool of claim 1, wherein the drive end includes a recess formed on an exterior thereof, and wherein the recess receives a lever portion of the reversing lever.

4. The tool of claim 1, further comprising a first cavity disposed in the drive end and in communication with the aperture, wherein the first and second pawls are disposed in the first cavity.

5. The tool of claim 4, further comprising a second cavity disposed in the drive end and in communication with the first cavity, the second cavity having a depth less than the first cavity, wherein the reversing disc is disposed in the second cavity.

6. The tool of claim 5, wherein each of the first and second pawls includes a selector post.

7. The tool of claim 6, wherein the reversing disc includes hooks adapted to selectively engage the respective selector posts to cause the selective engagement of one of the first and second pawl teeth with the ratchet gear and disengagement of the other of the first and second pawl teeth from the ratchet gear.

8. The tool of claim 5, further comprising a cover plate disposed on and closing the first and second cavities.

9. The tool of claim 5, wherein the first and second pawls each includes a relief portion on a side opposite the respective first and second pawl teeth.

10. The tool of claim 9, further comprising a spring disposed in the first cavity and in engagement with the relief portions of the first and second pawls, the spring is adapted to limit movement of one of the first and second pawl teeth away from the ratchet gear when such first and second pawl teeth is in selective engagement with the ratchet gear.

11. The tool of claim 1, wherein a portion of the edge that the channel extends from is curved.

12. A ratchet mechanism for a tool adapted to engage and apply a torque to a work piece, comprising:

a ratchet gear having:
  a receiving portion;
  an engagement surface surrounding the receiving portion and adapted to operatively engage the work piece; and
  ratchet teeth disposed on an outer circumferential surface;
first and second pawls respectively having first and second pawl teeth adapted to selectively engage the ratchet teeth;
a reversing lever having a stem portion and including a notch formed in the stem portion; and
a reversing disc including a channel extending from an edge of the reversing disc towards a central portion of the reversing disc in a radial direction, wherein the channel is adapted to receive the stem portion and allow the reversing disc to slide perpendicular to a longitudinal axis of the stem portion and into the notch, the reversing disc is adapted to co-rotate with the reversing lever when the reversing lever is moved between first and second positions to cause the selective engagement of one of the first and second pawl teeth with the ratchet teeth and disengagement of the other of the first and second pawl teeth from the ratchet teeth, thereby causing the receiving portion to provide the torque to the work piece in one of either first and second rotational directions and ratchet in the other of the first and second rotational directions.

13. The ratchet mechanism of claim 12, further comprising a spring disposed between the first and second pawls and adapted to bias the first and second pawls away from one another.

14. The ratchet mechanism of claim 12, wherein the reversing lever includes a lever portion operable by a user to select either one of the first and second rotational directions.

15. The ratchet mechanism of claim 12, wherein each of the first and second pawls includes a selector post; and
  the reversing disc includes hooks adapted to selectively engage the selector posts to selectively cause the selective engagement of one of the first and second pawl teeth with the ratchet teeth and disengagement of the other of the first and second pawl teeth from the ratchet teeth.

16. The ratchet mechanism of claim 12, wherein the first and second pawls each includes a relief portion on a side opposite the pawl teeth.

17. The ratchet mechanism of claim 16, further comprising a spring in engagement with the relief portions of the first and second pawls, the spring is adapted to limit movement of one of the first and second pawl teeth away from the ratchet teeth when such one of the first and second pawl teeth is selectively engaged with the ratchet teeth.

18. The ratchet mechanism of claim 12, wherein the reversing disc is disposed in a cavity of the tool having a minimum depth to accommodate the reversing disc.

19. The ratchet mechanism of claim 18, wherein the reversing disc includes a tab portion extending from a radial side.

20. The ratchet mechanism of claim 19, wherein the cavity includes first and second stops formed by a non-circular shape of the cavity.

* * * * *